US012595696B2

(12) United States Patent

Rowland et al.

(10) Patent No.: US 12,595,696 B2

(45) Date of Patent: Apr. 7, 2026

(54) SWITCH HINGE

(71) Applicant: Component Hardware Group, Inc., Matawan, NJ (US)

(72) Inventors: James Rowland, Bayville, NJ (US); Viranjitsinh Chudasama, Toms River, NJ (US)

(73) Assignee: COMPONENT HARDWARE GROUP, INC., Matawan, NJ (US)

( * ) Notice: Subject to any disclaimer, the term of this patent is extended or adjusted under 35 U.S.C. 154(b) by 305 days.

(21) Appl. No.: 17/844,893

(22) Filed: Jun. 21, 2022

(65) Prior Publication Data

US 2022/0403689 A1 Dec. 22, 2022

Related U.S. Application Data

(60) Provisional application No. 63/212,952, filed on Jun. 21, 2021.

(51) Int. Cl.
*E05D 11/00* (2006.01)

(52) U.S. Cl.
CPC ....... *E05D 11/0081* (2013.01); *E05Y 2400/44* (2013.01); *E05Y 2900/132* (2013.01)

(58) Field of Classification Search
CPC .................................................. E05D 11/0081
See application file for complete search history.

(56) References Cited

U.S. PATENT DOCUMENTS

| | | | | | |
|---|---|---|---|---|---|
| 2,264,746 | A * | 12/1941 | Ellwood | H01H 51/287 | |
| | | | | 335/154 | |
| 3,806,852 | A * | 4/1974 | Suska | H01H 3/162 | |
| | | | | 200/61.7 | |
| 3,896,404 | A * | 7/1975 | Peterson | H01H 36/0046 | |
| | | | | 200/61.7 | |
| 5,656,982 | A * | 8/1997 | Kurahara | H01H 36/004 | |
| | | | | 335/206 | |
| 10,167,657 | B2 * | 1/2019 | Gompper | E06B 5/006 | |
| 10,484,052 | B2 * | 11/2019 | Grosse | H04B 5/0093 | |
| 10,663,321 | B1 * | 5/2020 | Martin | G01D 5/241 | |
| 2017/0254129 | A1 * | 9/2017 | Gompper | E06B 5/006 | |
| 2022/0373247 | A1 * | 11/2022 | Pagnozzi | F25D 23/00 | |

OTHER PUBLICATIONS

Keil Catalogue, 2018, p. E13, (Year: 2018).*
R50-1030, 2016 (Year: 2016).*
Merriam Webster definition of "align," available at www.merriam-webster.com/dictionary/align, last accessed May 15, 2025.*

* cited by examiner

*Primary Examiner* — Jeffrey O'Brien
(74) *Attorney, Agent, or Firm* — Francis C. Hand; CARELLA, BYRNE, ET AL

(57) ABSTRACT

A hinge for a door pivotally mounted on a cabinet is provided with a switch for activating an electrical circuit within the cabinet. The switch has a reed sensor mounted within a base of the hinge for activating the electrical circuit and a magnetic actuator affixed to a pivot pin of the hinge for moving relative to the reed sensor to activate the reed sensor between a normally open position deactivating the electrical circuit when the door is closed and a closed position activating the electrical circuit when the door is open.

4 Claims, 3 Drawing Sheets

SWITCH HINGE

This is a Non-Provisional patent application and claims the benefit of Provisional Patent Application 63/212,952, filed Jun. 21, 2021.

This invention relates to a switch hinge with an on/off switch.

As is known various types of hinges are employed for mounting a door on a frame. In some cases, the hinges have a switch incorporated therein for opening and closing an electrical circuit for a light or other electrical appliance, such as a fan, within the cabinet.

For example, one known hinge is marketed by Component Hardware Group, Inc. of Lakewood N.J. under model number R50-2000, a Hinge Edgemount Cam Lift with Switch. This hinge is constructed with a housing that affixes to the cabinet and a post that affixes to a door and has a pivot pin that pivots within the housing during opening and closing of the door. In addition, the hinge has a cam construction to raise and lower the post during rotation on the housing. Also, the hinge has a plunger type switch mounted in the housing to be actuated by the pivot pin as the post is raised.

However, plunger type switches are not sealed and are therefore prone to water and gas entering within the switches thereby adversely affecting operation. These switches also have not always activated an electrical circuit during opening of a door employing hinges of this type.

Accordingly, it is an object of the invention to provide a switch hinge that is reliable in operation.

It is another object of the invention to provide a hinge with an internal switch that is of simple construction.

Briefly, the invention provides a hinge for a door that is pivotally mounted on a cabinet and that has a switch incorporated therein for opening and closing an electrical circuit for a light or other electrical appliance, such as a fan, within the cabinet.

The hinge comprises a housing for securement to the cabinet that has an outwardly projecting base with a first cam surface thereon; a post for securement to the door that has a pivot pin pivotally mounted in the base for movement of the post between a closed position and an open position and a second cam surface in mating engagement with the first cam surface for moving the post axially of the pivot pin relative to the base during pivoting of the pivot pin in the base.

In accordance with the invention, the switch has a reed sensor with normally closed contacts mounted within the base for activating the electrical circuit and a magnetic actuator affixed to the pivot pin to open the normally closed contacts in order to de-activate the electrical circuit. The magnetic actuator is movable with the pivot pin of the post relative to the reed sensor to move the magnetic field away from the contacts so that the contacts return to the normally closed position activating the electrical circuit.

In one embodiment, the magnetic actuator is press-fitted in the pivot pin.

In a second embodiment, the magnetic actuator is concentrically fixed on one end of the pivot pin.

In each embodiment, the magnetic actuator creates a magnetic field for opening the normally closed contacts of the reed sensor.

These and other objects and advantages of the invention will become more apparent from the following detailed description taken in conjunction with the accompanying drawings wherein.

Figure 1:
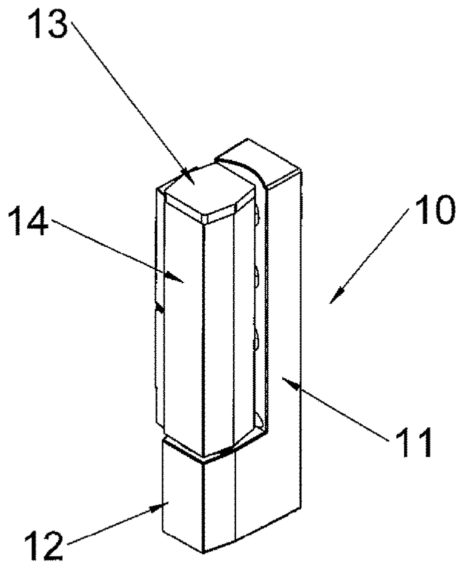
FIG. 1 illustrates a perspective view of a switch hinge constructed in accordance with the invention.
Figure 2:
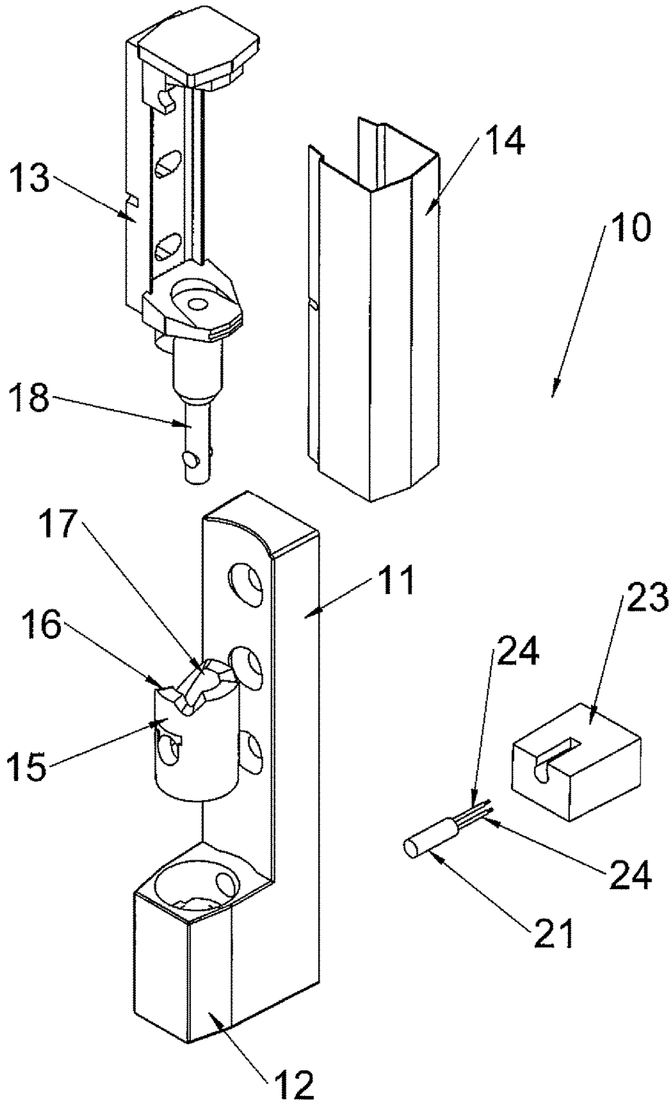
FIG. 2 illustrates an exploded view of the switch hinge of FIG. 1.

Referring to FIGS. 1 and 2, the switch hinge 10 is constructed for pivotally mounting a door (not shown) on a cabinet (not shown) on a vertical axis.

The hinge 10 is constructed in a manner similar to the model number R50-2000, a Hinge Edgemount Cam Lift with Switch referenced above and comprises a housing 11 for securement to the cabinet (not shown) that has an outwardly projecting hollow base 12, a post 13 for securement to the door (not shown) and a cover 14 for fitting over the post 13.

In addition, the hinge 10 has a cylindrical cam 15 seated in the base 12 with a circumferential cam surface 16 at the upper end, as viewed, disposed about a central bore 17 that passes through the cam 15.

The post 13 has a depending pivot pin 18 that is rotatably mounted in the bore 17 of the cam 15 and a circumferential cam surface 19 on an underside that surrounds the pivot pin 18 and is matingly received on the cam surface 16 of the cam 15. The cam surfaces 16, 19 are shaped such that the post 13 moves vertically, as viewed, relative to the housing 11 as the post 13 rotates relative to the housing 11 between a closed position of the door (not shown) relative to the cabinet (not shown) and an open position of the door relative to the cabinet.

The hinge 10 is also provided with a switch 20 for activating an electrical circuit (not shown) for a light or other electrical appliance, such as a fan, within the cabinet (not shown).

Figure 3:
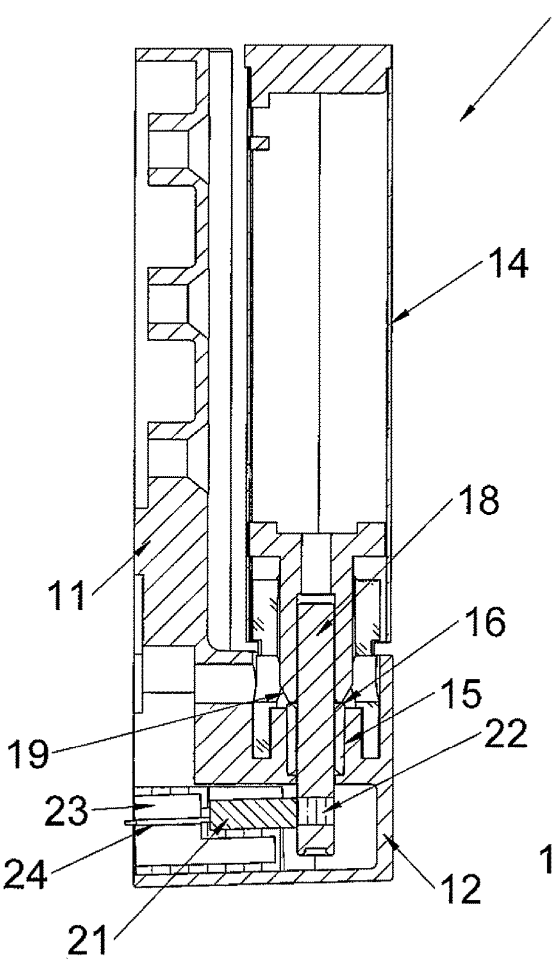
FIG. 3 illustrates an axial cross-sectional view of the switch hinge of FIG. 1.

Referring to FIGS. 2 and 3, the switch 20 has a reed sensor 21 mounted within the base 12 for activating the electrical circuit and a magnetic actuator 22 affixed to the pivot pin 18 for moving therewith relative to the reed sensor 21 to activate the reed sensor 21 between a normally closed position activating the electrical circuit and an open position de-activating the electrical circuit.

The reed sensor 21 is an off-the-shelf sensor that has a pair of ferromagnetic flexible metal contacts (not shown) in a hermetically sealed glass envelope. For example, the reed sensor 21 is similar to a Model 59020-1-S-02-F obtained from Mouser Electronics of Mansfield, Tex. The contacts are normally closed, opening when a magnetic field is present.

Figure 4:
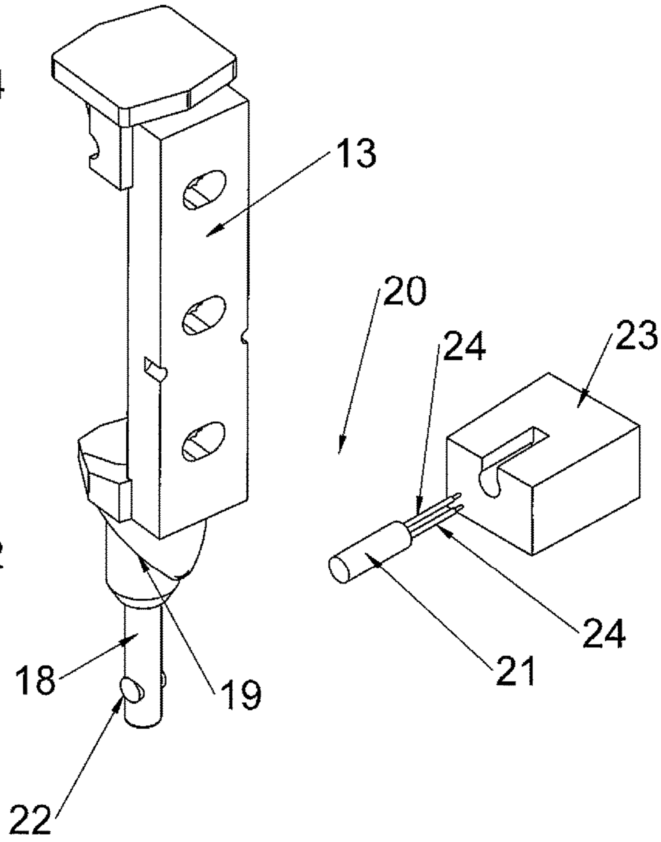
FIG. 4 illustrates an exploded view of the post, and switch of FIG. 2.

Referring to FIGS. 2, 3 and 4, the reed sensor 21 is slidably mounted in a block 23 that is sized to be slidably mounted in the hollow base 12 from the rear and has a pair of wires 24 for connecting electrically to the electrical circuit in the cabinet (not shown).

The magnetic actuator 22 is a permanent magnet having a magnetic field for opening the metal contacts of the reed sensor 21 with the actuator 22 opposite the reed sensor 21 as indicated in FIG. 3. For example, the actuator is a Model 57020 also obtained from Mouser Electronics.

The actuator 22 is of cylindrical shape and is press-fitted transversely into the pivot pin 18 to be in alignment with the reed sensor 21 and opposite the reed sensor 21 in the closed position of the hinge 10, i.e. with the door (not shown) in the closed position relative to the cabinet (not shown). In this position, the magnetic field of the actuator 22 causes the contacts of the reed sensor 21 to open away from each other thereby deactivating the electrical circuit within the cabinet (not shown).

Thus, as the door (not shown) is moved from the closed position of the door (not shown) relative to the cabinet (not shown) to an open position of the door relative to the cabinet, the post 13 moves vertically, as viewed, causing the pivot pin 18 to move vertically, i.e. axially of the pivot pin 18 relative to the base 12.

When the post 13 pivots on the base 12, the pivot pin 18 moves vertically, as viewed, and the actuator 22 moves away from alignment with the reed sensor 21 and out of opposition to said reed sensor 21 thereby moving the magnetic field from having an effect on the contacts of the reed sensor 21. This allows the contacts of the reed sensor 21 to return to the normally closed position thereby activating the electrical circuit in the cabinet.

Figure 5:
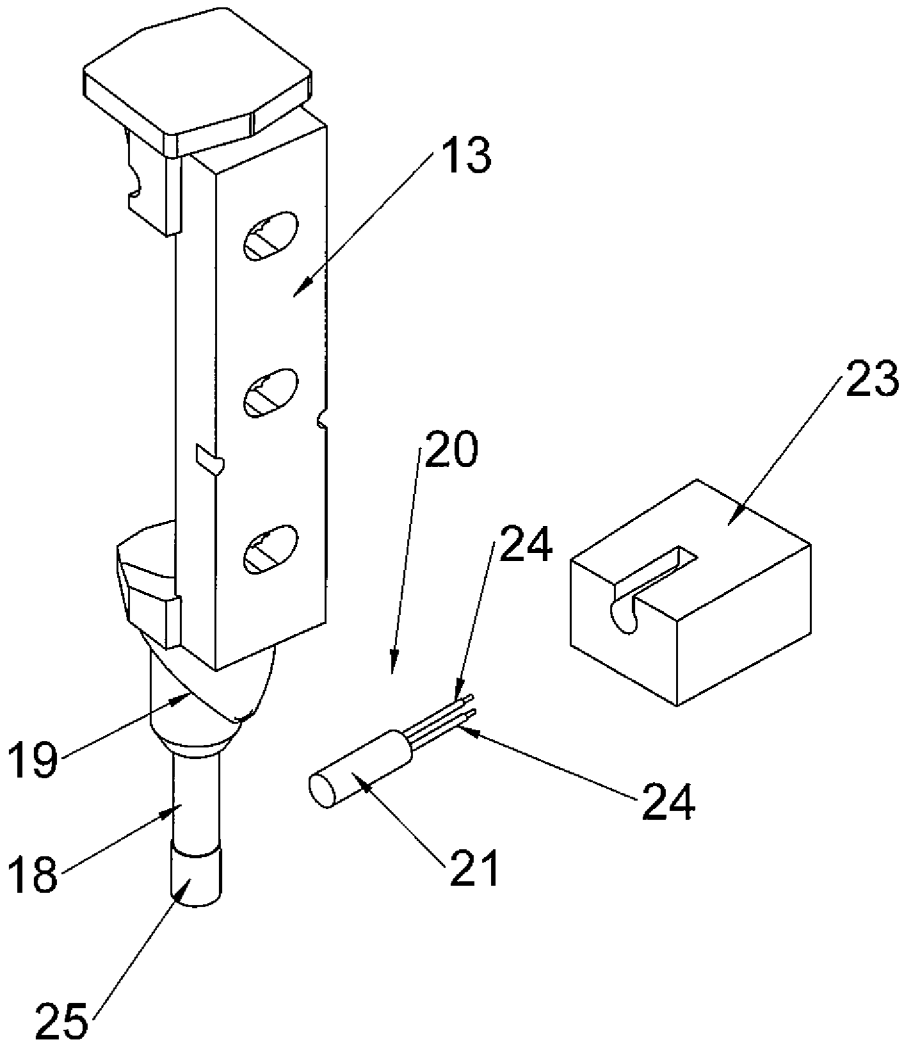
FIG. 5 illustrates an exploded view of the post of a switch hinge with a modified switch in accordance with the invention.

Referring to FIG. 5, wherein like reference characters indicate like parts as above, the switch 20' has a reed sensor 21, as above, mounted within the base 12 for activating the electrical circuit and a magnetic actuator 25 of sleeve shape that is concentrically fixed on one end of the pivot pin 18. As above, the magnetic actuator 25 has a magnetic field for opening the normally closed metal contacts of the reed sensor 21 with the actuator 22 opposite the reed sensor 21.

The invention thus provides a switch hinge of a cam-lift type with a switch that is not prone to the entry of water and/or gas that may adversely affect operation and that is reliable in operation.

The invention also provides a hinge with an internal switch that is of simple construction.

What is claimed is:

1. A hinge for a door pivotally mounted on a cabinet, said hinge comprising a housing for securement to the cabinet, said housing having an outwardly projecting base with a first cam surface thereon;

a post for securement to a door, said post having a pivot pin pivotally mounted in said base for movement of said post between a closed position and an open position and a second cam surface in mating engagement with said first cam surface for moving said post axially of said pivot pin relative to said base during pivoting of said pin in said base; and a switch for activating an electrical circuit within the cabinet, said switch having a reed sensor mounted within said base for activating the electrical circuit and a magnetic actuator affixed to said pivot pin for moving therewith relative to said reed sensor to activate said reed sensor between an open position deactivating the electrical circuit with said magnetic actuator in alignment with said reed sensor and opposite said reed sensor and a normally closed position activating the electrical circuit with said magnetic actuator out of alignment with said reed sensor and out of opposition to said reed sensor.

2. A hinge as set forth in claim 1 wherein said magnetic actuator is press-fitted in said pivot pin.

3. A hinge as set forth in claim 1 wherein said magnetic actuator is concentrically fixed on one end of said pivot pin.

4. A hinge as set forth in claim 1 wherein said reed sensor has a pair of normally closed ferromagnetic flexible metal contacts and said magnetic actuator has a magnetic field for moving said metal contacts from said open position to said normally closed position for activating said reed sensor.

* * * * *